(12) United States Patent
Bregman et al.

(10) Patent No.: US 11,303,508 B2
(45) Date of Patent: Apr. 12, 2022

(54) DEPLOYMENT STATE BASED CONFIGURATION GENERATION

(71) Applicant: Red Hat Israel, Ltd., Ra'anana (IL)

(72) Inventors: Arie Bregman, Gan Yavne (IL); Or Idgar, Tel Aviv (IL)

(73) Assignee: Red Hat Israel, LTD., Ra'anana (IL)

( * ) Notice: Subject to any disclaimer, the term of this patent is extended or adjusted under 35 U.S.C. 154(b) by 138 days.

(21) Appl. No.: 15/844,056

(22) Filed: Dec. 15, 2017

(65) Prior Publication Data
US 2019/0190776 A1 Jun. 20, 2019

(51) Int. Cl.
| | |
|---|---|
| *H04L 12/24* | (2006.01) |
| *G06F 8/61* | (2018.01) |
| *H04L 29/08* | (2006.01) |
| *G06F 9/455* | (2018.01) |
| *G06F 9/50* | (2006.01) |
| *H04L 41/0803* | (2022.01) |
| *H04L 67/10* | (2022.01) |

(52) U.S. Cl.
CPC ........... *H04L 41/0803* (2013.01); *G06F 8/63* (2013.01); *G06F 9/45558* (2013.01); *G06F 9/5077* (2013.01); *G06F 2009/4557* (2013.01); *G06F 2009/45595* (2013.01); *H04L 67/10* (2013.01)

(58) Field of Classification Search
CPC . H04L 41/0803; H04L 67/10; G06F 9/45558; G06F 2009/4557; G06F 2009/45595
USPC ........................................................ 709/223
See application file for complete search history.

(56) References Cited

U.S. PATENT DOCUMENTS

| | | | |
|---|---|---|---|
| 7,150,037 B2 * | 12/2006 | Wolf .................... | H04L 41/0213 726/6 |
| 7,475,097 B2 | 1/2009 | Kaler et al. | |
| 2007/0283011 A1 * | 12/2007 | Rakowski ........... | H04L 41/0803 709/225 |
| 2008/0065702 A1 * | 3/2008 | Dickerson ............. | G06F 16/217 |
| 2008/0097626 A1 * | 4/2008 | Reed .................. | G05B 19/4184 700/30 |
| 2008/0215713 A1 * | 9/2008 | Cannon ............... | H04L 41/0866 709/221 |

(Continued)

OTHER PUBLICATIONS

Reverse Desired State Configuration: How it works; The Scripting Guys; Oct. 27, 2017; (8 pages).

(Continued)

*Primary Examiner* — Kevin T Bates
*Assistant Examiner* — Chen-Liang Huang
(74) *Attorney, Agent, or Firm* — K&L Gates LLP

(57) ABSTRACT

Deployment state based configuration generation is disclosed. For example, a first node is in a first deployment state, with a state daemon executing on the first node. A configuration generator may be associated with one or more processors. The state daemon records a first configuration instruction associated with a first modification to the first deployment state, where the first node is in a second deployment state after the first modification. The configuration generator generates a first configuration based on the second deployment state including the first configuration instruction. The first configuration is stored to a configuration repository, where the first configuration is deployed to a second node converting the second node to the second deployment state.

18 Claims, 8 Drawing Sheets

(56) References Cited

U.S. PATENT DOCUMENTS

| | | | | |
|---|---|---|---|---|
| 2011/0202983 A1* | 8/2011 | Pope | ................... | H04L 63/061 |
| | | | | 726/7 |
| 2012/0144390 A1* | 6/2012 | Farmer | ............... | G06F 9/45558 |
| | | | | 718/1 |
| 2013/0185402 A1* | 7/2013 | Ayanam | .............. | H04L 41/0813 |
| | | | | 709/221 |

OTHER PUBLICATIONS

Configuration Management, Increased efficiency, stability and control through automation; info@number.eu; https://www/nubera.eu/configuration-management; retrieved Nov. 22, 2017; pp. 1-7.

* cited by examiner

DEPLOYMENT STATE BASED CONFIGURATION GENERATION

BACKGROUND

The present disclosure generally relates to generating configuration files for computer systems hosted on distributed hosting platforms, such as multi-tenant clouds. Automated configuration management utilities are typically employed to quickly scale deployments of updated computer systems in large environments. Computing environments may be scaled by deploying additional physical hardware. In some systems, it may be advantageous to scale application deployments by using isolated guests such as virtual machines and containers that may be used for creating hosting environments for running application programs. Typically, isolated guests such as containers and virtual machines may be launched to provide extra compute capacity more quickly than deploying physical hardware. Isolated guests may be deployed in a variety of hardware environments. There may be economies of scale in deploying hardware in a large scale. Developing updated versions of computer systems, whether physical or virtualized, may take place in development hosts where testing may take place. Typically, after a new system version is finalized in a development environment, the changes implemented to create the new system version may need to be reconciled into a deployment configuration for the new system version.

SUMMARY

The present disclosure provides a new and innovative system, methods and apparatus for deployment state based configuration generation. In an example, a first node is in a first deployment state, with a state daemon executing on the first node. A configuration generator may be associated with one or more processors. The state daemon records a first configuration instruction associated with a first modification to the first deployment state, where the first node is in a second deployment state after the first modification. The configuration generator generates a first configuration based on the second deployment state including the first configuration instruction. The first configuration is stored to a configuration repository, where the first configuration is deployed to a second node converting the second node to the second deployment state.

Additional features and advantages of the disclosed method and apparatus are described in, and will be apparent from, the following Detailed Description and the Figures.

DETAILED DESCRIPTION OF EXAMPLE EMBODIMENTS

Figure 1:
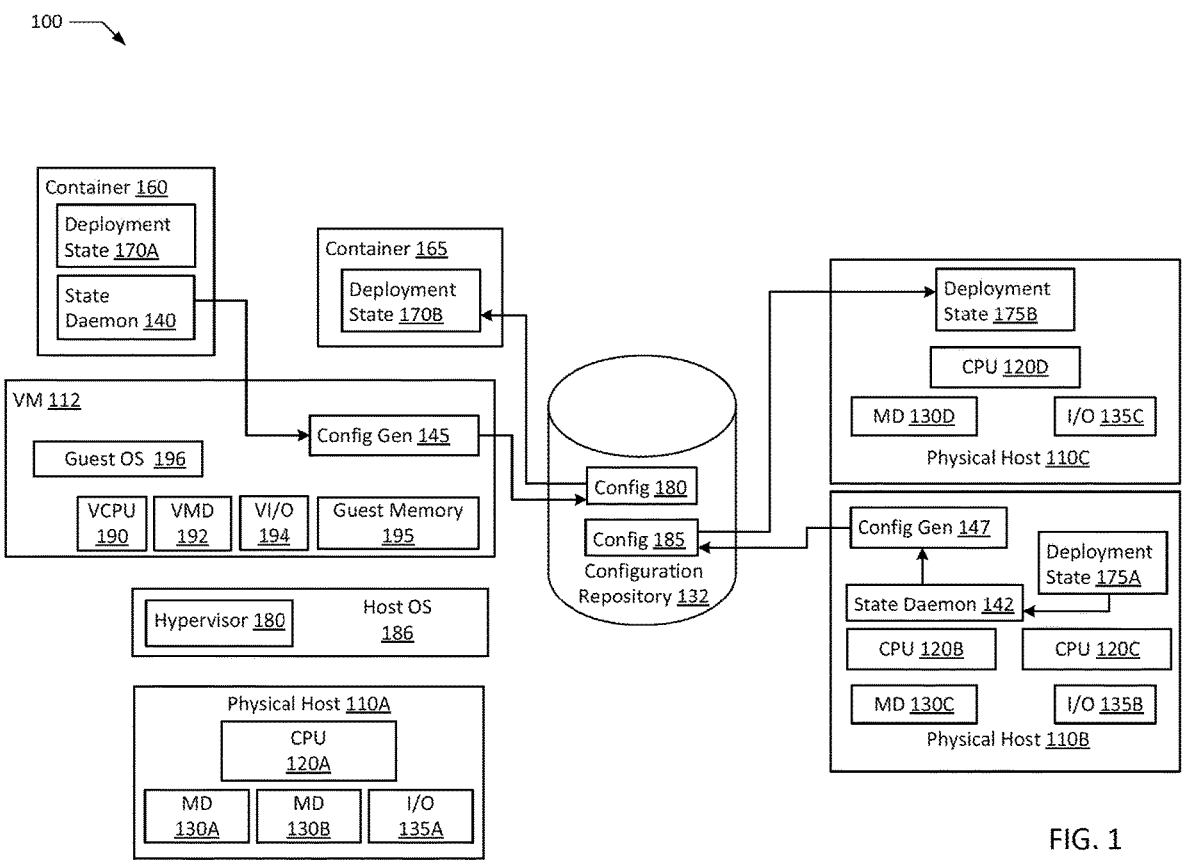
FIG. 1 is a block diagram of a deployment state based configuration generation system with locally deployed daemons according to an example of the present disclosure.

In computer systems, applications may typically handle higher loads (e.g., more users, larger data sets, etc.) by being deployed to more hosts and thereby gaining access to more computing resources. Typically, a distributed application deployed over multiple hosts may be deployed in a standardized package that ensures the same code is executing across various instances of the application and hosts. Preparing such packages for deployment may often be a significant reverse engineering task for developers seeking to transition new code from a testing or development environment to a production environment. In some environments, isolated guests, typically, virtual machines and/or containers are used. In an example, a virtual machine ("VM") may be a robust simulation of an actual physical computer system utilizing a hypervisor (e.g., Red Hat® KVM and Red Hat® KVM hypervisor) to allocate physical resources to the virtual machine. In some examples, a container based virtualization system such as Red Hat® OpenShift® or Docker® may be advantageous as container based virtualization systems may be lighter weight than systems using virtual machines with hypervisors. In the case of containers, oftentimes a container will be hosted on a physical host or virtual machine that already has an operating system ("OS") (e.g., Red Hat Enterprise Linux®) executing, and the container may be hosted on the operating system of the physical host or VM. In large scale implementations, container schedulers, such as those included in container orchestrators (e.g., Kubernetes®), generally respond to frequent container start-ups and cleanups with low latency. Isolated guests may allow wide spread, parallel deployment of computing power for specific tasks. In a typical example, a container may be instantiated to process a specific task and reaped after the task is complete.

Due to economies of scale, containers often tend to be more advantageous in large scale hardware deployments where the relatively fast ramp-up time of containers allows for more flexibility for many different types of applications to share computing time on the same physical hardware, for example, in a private or multi-tenant cloud environment. In some examples, where containers from a homogenous source are deployed, it may be advantageous to deploy containers directly on physical hosts. In a multi-tenant cloud, it may be advantageous to deploy containers and groups of containers within virtual machines as the hosting service may not typically be able to predict dependencies for the containers such as shared operating systems, and therefore, using virtual machines (e.g., with Red Hat Virtualization®) adds flexibility for deploying containers from a variety of sources on the same physical host. In many examples, containers may be constructed as stand units that don't change while deployed, and therefore executing containers typically require less permissions on the host to execute than VMs. More restricted access to the hosting environment typically improves security by avoiding potential security gaps that may be exploited, both as between different tenants on the same cloud and between tenants and guests accessing services over the interne. In addition, since containers typically do not require capabilities to execute new code or install new software, potential security risks with those types of functionality may be reduced by eliminating support for such tasks. In an example, hosting containers directly on physical servers may yield further efficiencies, but may restrict the containers executing on the physical servers to containers that are compatible with the physical server's host operating system. In comparison, hosting containers inside VMs may enable the hosting of containers with different architectures on the same physical server. In an example, physical and/or virtual host nodes may each host dozens or hundreds of containers, each of which may independently execute tasks.

Typically, regardless of whether a host is virtualized, deploying new code may be periodically required. Even in an environment where all of the user facing applications are virtualized in containers, the physical and/or virtual hosts hosting the containers may still be executing code, such as operating system code and container virtualization code for a container engine. These components may be periodically updated as well. Configuration management applications (e.g., Red Hat® Ansible®, Puppet®, Chef®, SaltStack®) may be executed to generate any host specific configurations for a service, install the service, and/or start execution of the service with any host specific configurations. Configuration management applications may allow for rapid deployment of updated system settings and applications to a broad spectrum of hosts. However, setting up configurations for input into configuration management applications may be a very tedious, highly manual reverse engineering task prone to human error. In addition, various competing configuration management applications typically employ mutually incompatible configuration files, resulting in added administrative overhead in large mixed deployment environments (e.g., multi-tenant clouds).

The present disclosure aims to address the above discussed issues including the scalability bottleneck for application deployment by implementing deployment state based configuration generation. In an example, a vendor neutral solution may be implemented for capturing a current, live deployment state of a development server, which may then be used to generate a configuration file for a configuration management application to deploy the deployment state of the development server to live production servers, whether physical or virtual. In various examples, deployment state information may be remotely queried from a centralized deployment orchestration service, and/or gathered from deployment state tracking daemons executing on the development environment being cloned. Configuration instructions may be generated for any changes required to transition an existing system build (e.g., image file, installation file for a previous release, etc.) to the desired deployment state. The configuration instructions may be translated to be compatible with different configuration management applications. In some examples, configuration instructions and/or vendor specific configuration files be leveraged to generate updated image files for rapid deployment of updated virtualized instances of an application or service. By reducing the chances of human error impacting configuration generation and allowing for on demand incremental configuration generation, deployment state based configuration generation greatly increases the speed with which updated computer systems may be deployed in scale.

FIG. 1 is a block diagram of a deployment state based configuration generation system with locally deployed daemons according to an example of the present disclosure. The system 100 may include one or more physical hosts 110A-C. Each physical host 110A-C may in turn include one or more physical processors (e.g., CPU 120A-D) communicatively coupled to memory devices (e.g., MD 130A-D) and input/output devices (e.g., I/O 135A-C). As used herein, physical processor or processors 120A-D refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 130A-D refer to volatile or non-volatile memory devices, such as RAM, ROM, EEPROM, or any other device capable of storing data. As discussed herein, I/O devices 135A-C refer to devices capable of providing an interface between one or more processor pins and an external device, the operation of which is based on the processor inputting and/or outputting binary data. CPUs 120A-D may be interconnected using a variety of techniques, ranging from a point-to-point processor interconnect, to a system area network, such as an Ethernet-based network. Local connections within each physical host 110A-C, including the connections between a processor 120A and a memory device 130A-B and between a processor 120A and an I/O device 135A may be provided by one or more local buses of suitable architecture, for example, peripheral component interconnect (PCI).

In an example, physical hosts 110A-C may run one or more isolated guests, for example, VM 112, containers 160 and 165. In an example, any of containers 160 and 165 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VM 112 may execute on physical host 110A. In an example, containers 160 and 165 may execute on VM 112. In an example, state daemon 140 may execute on container 160. In an example, configuration generator 145 may execute on VM 112. In other examples, configuration generator 145 may execute on any system communicatively coupled with container 160. For example, configuration generator 145 may execute on another container on VM 112, directly on VM 112, or on physical host 110A. In an example, any of containers 160 and 165 may execute directly on either of host 110A without a virtualized layer in between. In an example, isolated guests may be further nested in other isolated guests. For example, VM 112 may host containers (e.g., containers 160 and 165). In addition, containers and/or VMs may further host other guests necessary to execute their configured roles. For example, VM 112 and/or a container (e.g., containers 160 and 165) may further host a Java® Virtual Machine ("JVM") if execution of Java® code is necessary.

System 100 may run one or more VMs (e.g., VM 112), by executing a software layer (e.g., hypervisor 180) above the hardware and below the VM 112, as schematically shown in FIG. 1. In an example, the hypervisor 180 may be a component of host operating system 186 executed by the system 100. In another example, the hypervisor 180 may be provided by an application running on operating system 186, or may run directly on physical host 110A without an operating system beneath them. Hypervisor 180 may virtualize the physical layer, including processors, memory, and I/O devices, and present this virtualization to VM 112 as devices, including virtual central processing units ("VCPUs") 190, virtual memory devices ("VMDs") 192, virtual input/output ("VI/O") devices 194, and/or guest memories 195. In an example, a container may execute directly on host OSs 186 without an intervening layer of virtualization. In an example, a VM 112 may be a virtual machine and may execute a guest operating system 196 which may utilize the underlying VCPU 190, VIVID 192, and VI/O 194. One or more isolated guests (e.g., containers 160 and 165) may be running on VM 112 under the guest operating system 196. Processor virtualization may be implemented by the hypervisor 180 scheduling time slots on one or more physical processors 120A such that from the guest operating system's perspective those time slots are scheduled on a virtual processor 190.

VM 112 may run on any type of dependent, independent, compatible, and/or incompatible applications on the underlying hardware and host operating system 186. In an example, containers 160 and 165 running on VM 112 may be dependent on the underlying hardware and/or host operating system 186. In another example, containers 160 and 165 running on VM 112 may be independent of the underlying hardware and/or host operating system 186. In an example, containers 160 and 165 running on VM 112 may be compatible with the underlying hardware and/or host operating system 186A. Additionally, containers 160 and 165 running on VM 112 may be incompatible with the underlying hardware and/or OS. The hypervisor 180 may manage memory for the host operating system 186 as well as memory allocated to the VM 112 and guest operating system 196 such as guest memory 195 provided to guest OS 196. In an example, physical hosts 110A-C, VM 112, and/or containers 160 and 165 may be connected by any form of suitable network for enabling communications between computing devices, for example, a public network (e.g., the Internet), a private network (e.g., a local area network (LAN) or wide area network (WAN)), or a combination thereof.

Physical hosts 110B-C may in turn include one or more physical processors (e.g., CPU 120B-D) communicatively coupled to memory devices (e.g., MD 130C-D) and input/output devices (e.g., I/O 135B-C). In an example, physical hosts 110B-C may have similar architecture to physical host 110A, with CPUs 120B-D corresponding to CPU 120A, MD 130C-D corresponding to MD 130A-B, and I/O 135B-C corresponding to I/O 135A.

In the example, state daemon 140 may track changes to deployment state 170A of container 160. In an example, deployment state 170A may include settings, features, and/or components of container 160 relevant to the execution of container 160. In some examples, deployment state 170A may include all of the necessary data to completely clone container 160. In other examples, deployment state 170A may include a subset of the total settings of container 160, for example, restricted based on user or group permissions to those settings and components associated with a user or group. In some examples, deployment state 170A may be an incremental state based on a given starting state. In an example, configuration generator 145 may compile state change information collected by state daemon 140 and construct a configuration 180 compatible with a configuration management application from the state change information. In an example, state daemon 140 and/or configuration generator may be implemented via any form of executable code (e.g., executable file, script, application, service, daemon). In an example, container 165 may clone deployment state 170A, for example, by executing a configuration management application with configuration 180, resulting in container 165 executing in deployment state 170B which is a clone of deployment state 170A.

In an example, state daemon 142 may execute directly on physical host 110B, and state change information tracked by state daemon 142 may be recorded to track changes to deployment state 175A of physical host 110B. In an example, configuration generator 147 may also execute on physical host 110B and may generate configuration 185, which may in turn allow another physical host (e.g., physical host 110C) to clone deployment state 175A. In an example, physical host 110C clones deployment state 175A as deployment state 175B, for example, by executing a configuration management application with configuration 185.

In an example, configuration repository 132 may be any form of suitable storage system for configuration files, for example a relational database. The configuration repository 132 may be stored in a database associated with a database management system ("DBMS"). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, a relational database may be implemented with add-on packages and/or services for additional functionality and security (e.g., Red Hat Database®). In an example, configuration repository 132 may be stored in a database organized as a formal database with a schema such as a relational schema with defined tables, indices, links, triggers, various commands etc. In some examples, configuration repository 132 may not be organized as a formal database, but may instead be an alternative storage structure capable of holding the information stored in configuration repository 135, including but not limited to a file, folder, directory, registry, array, list, etc.

Figure 2:
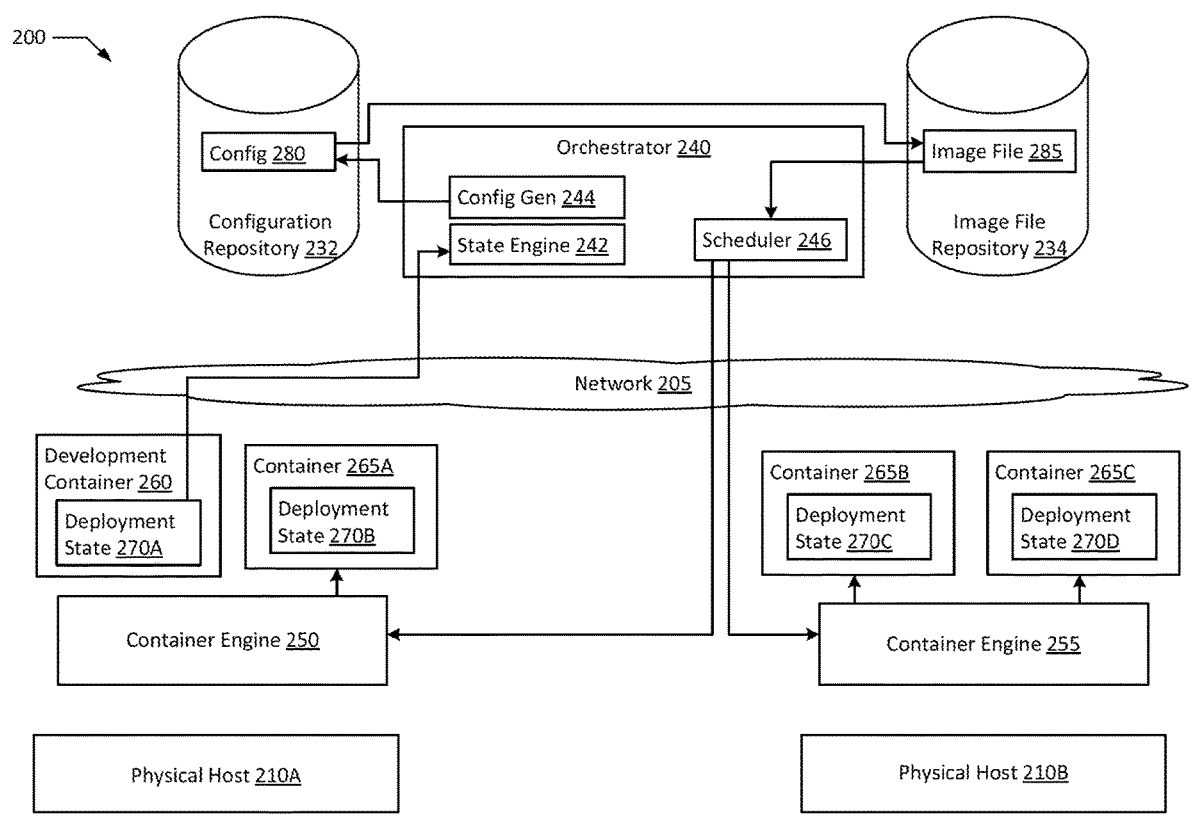
FIG. 2 is a block diagram of an orchestrated, distributed, deployment state based configuration generation system with according to an example of the present disclosure.

FIG. 2 is a block diagram of an orchestrated, distributed, deployment state based configuration generation system with according to an example of the present disclosure. In an example, illustrated system 200 may be a similar system to system 100. In an example, illustrated system 200 may be interconnected with system 100, for example, over network 205 which may be any form of suitable network for enabling communications between computing devices, for example, a public network (e.g., the Internet), a private network (e.g., a local area network (LAN) or wide area network (WAN)), or a combination thereof. In an example, physical hosts 210A-B may be analogous to physical hosts 110A-C and may be similarly configured. In an example, container engines 250 and 255 may be any form of virtualization system capable of launching containers (e.g., Docker®). In an example, development container 260 and container 265A may be launched by container engine 250, while containers 265B-C may be launched by container engine 255.

Illustrated system 200 depicts a similar system to system 101, where containers (e.g., development container 260 and containers 265A-C) are hosted directly on physical hosts 210A-B. In an example, development container 260 may be instantiated from an image file and then modified, while containers 265A-C may be instantiated from image file 285, which may in turn be constructed based on deployment state 270A of development container 260.

In an example, configuration repository 232 may be any form of storage system for configuration data, such as configuration files and/or metadata. In an example, configuration repository 232 is located across a network from physical hosts 210A and 210B. In an example, configuration repository 232 may be implemented as a configuration database (e.g., in a relational database). In another example, configuration repository 232 may be implemented as a distributed storage for configuration data such as a distributed key value store (e.g., etcd). In an example, containers 265A-C may be configured to query configuration repository 232 for updated configuration settings. In an example, the configuration repository 232 may be added to an environment variable and/or a path of containers 265A-C and may be a default location for saving and retrieving configuration data. In an example, image file repository 234 may be any form of storage system suitable for storing image files (e.g., a relational database, FTP server, network attached storage, etc.)

In an example, orchestrator 240 may be an isolated guest deployment orchestration service managing the deployment of isolated guests in system 200, for example Google® Kubernetes® or Red Hat® OpenShift®, capable of scheduling containers to execute on hosts (e.g., physical hosts 210A-B) managed by orchestrator 240. In an example, state engine 242, configuration generator 244, and scheduler 246 may be components of orchestrator 240 implemented through any suitable programmatic code. In an example, state engine 242 may retrieve deployment states of containers (e.g., deployment state 270A of development container 260). In the example, state engine 242 may rely on remote queries to indirectly derive deployment state 270A, for example, by scraping relevant system log files of development container 260. In some examples, development container 260 may execute a state daemon to provide configuration information regarding deployment state 270A directly to state engine 242. In an example, configuration generator 244 utilizes state information regarding development state 270A retrieved by state engine 242 to generate configuration 280 stored in configuration repository 232. In the example, configuration 280 is an input for updating an image file from which development container 260 is launched into a new image file 285 which when launched by container engine 250 and/or container engine 255 results in new containers cloning deployment state 270A (e.g., containers 265A-C in deployment states 270B-D). In an example, scheduler 246 may be any suitable scheduler (e.g., CoreOS® Fleet, Mesosphere® Marathon, Docker Swarm®, Apache® Mesos, Google® Kubernetes®, Docker® Compose, etc.) implemented in orchestrator 240 managing the deployment of guests in system 200.

Figure 3:
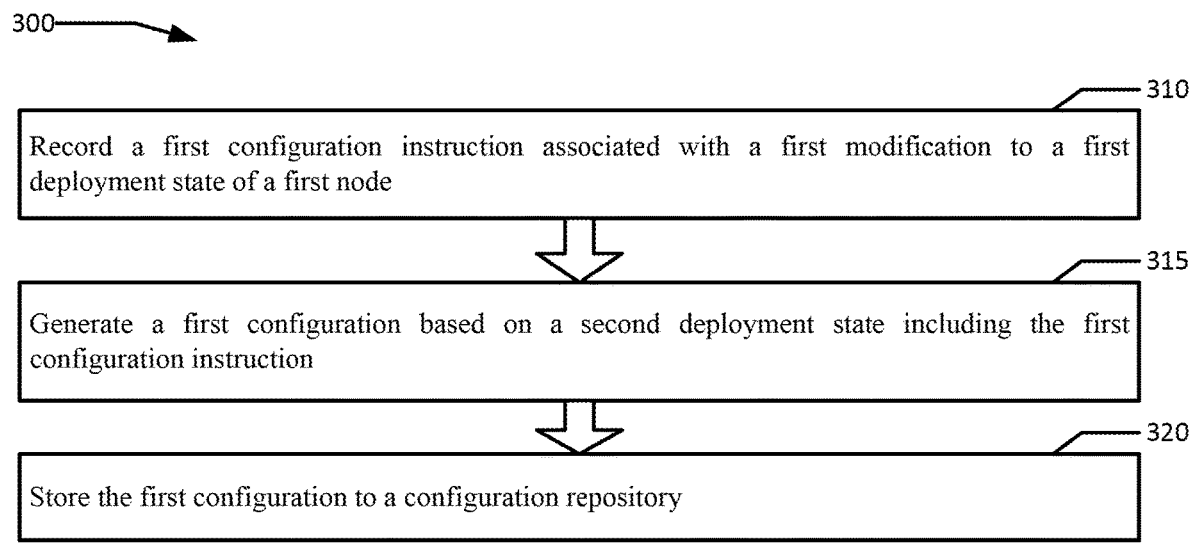
FIG. 3 is a flowchart illustrating an example of deployment state based configuration generation according to an example of the present disclosure.

FIG. 3 is a flowchart illustrating an example of deployment state based configuration generation according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by state daemon 140 and configuration generator 145.

Example method 300 may begin with recording a first configuration instruction associated with a first modification to a first deployment state of a first node, wherein the first node is in a second deployment state after the first modification and a state daemon executes on the first node (block 310). In an example, state daemon 140 may record a modification to container 160. For example, state daemon 140 may subscribe to notifications (e.g., from guest OS 196) notifying state daemon 140 of changes to container 160 and therefore deployment state 170A. In an example, other sources of changes to container 160 tracked by state daemon 140 may include configuration files (e.g., of applications installed on container 160), parsing logs (e.g., of application installers such as yum), executing commands (e.g., to query container 160 and/or guest OS 196), and API calls to retrieve system status information. In an example, state daemon 140 may record a configuration instruction based on each tracked modification of container 160. In an example, a configuration instruction may be based on a notification received by state daemon 140. In certain environments, a command resulting in a change on container 160 may not be logged on container 160, and may instead be logged, for example, at the source of the command. In such an example, state daemon 140 may track the modification based on the effect of the command rather than based on tracking the origin of the command. For example, state daemon 140 may detect a new application being installed, even if the command to execute the install was on a different server, based on tracking the installer making changes to for example,/bin. In some examples, state daemon 140 may intercept API calls, for example, through a network interface of container 160 and may track changes and generate configuration instructions based on the intercepted API calls. In an example, a discrete configuration instruction may be a configuration management task executable by a configuration management application. For example, a task may be to install gimp changing gimp's state from absent to present, or vise versa.

In some examples, certain notifications may be ignored by state daemon 140. For example, in a shared environment, state daemon 140 may ignore changes made by other users. In another example, state daemon 140 may ignore an instruction, for example, to delete files associated with a removed unused component. In the example, since the state daemon 140 may instead record an instruction that the unused component should never be installed in a new build, and therefore a cleanup instruction deleting files may be unnecessary. In an example, state daemon 140 records and tracks instructions necessary to progress a system from a configurable starting point to a current deployment state. In an example, state daemon 140 and/or configuration generator 145 may combine multiple actions into one configuration instruction. For example, an application may be installed, configured, and executed to make a change to container 160, and then the application may be uninstalled as cleanup. In the example, rather than separate instructions for installation, configuration, execution, and removal, state daemon 140 may instead store instructions to directly effect the outcome by changing a set of system settings in container 160. In an example, the starting state tracked by state daemon 140 may be based on an original image file from which container 160 is launched.

A first configuration is generated based on the second deployment state including the first configuration instruction (block 315). In an example, configuration generator 145 may take inputs from state daemon 140 in the form of configuration instructions and generate configuration 180, which may be a set of configuration management application inputs that allow the configuration management application to convert a system with the same starting baseline as container 160 (e.g., launched from the same image file) to the current deployment state 170A of container 160. In an example, state daemon 140 may store configuration instructions in a vendor neutral format, while configuration 180 may be in a format compatible with a specific configuration management application or agent (e.g., Red Hat® Ansible®). In an example, configuration generator 145 may additionally output configuration files compatible with other configuration management applications or agents (e.g., Puppet®, Chef®, SaltStack®) based on deployment state 170A. For example, configuration 180 may be output in the format of an Red Hat® Ansible® playbook, Puppet® manifest, Chef® recipe, SaltStack® formula, etc. In an example, configuration generator 145 may be across a network from state daemon 140 and/or container 160, and configuration generator 145 may retrieve a configuration instruction and/or a specification listing components of deployment state 170A from state daemon 140. For example, state daemon 140 may output configuration instructions to take a newly launched container to deployment state 170A. In another example, state daemon 140 may provide a listing of applications, system settings, and/or configuration files associated with various system components upon request. In an example, a new image file may be constructed based on system information gathered by state daemon 140. In an example, configuration information tracked by state daemon 140 may include currently executing applications along with execution flags and/or settings of the executing applications.

The first configuration is stored to a configuration repository, wherein the first configuration is deployed to a second node converting the second node to the second deployment state (block 320). In an example, configuration 180 is stored to configuration repository 132. In the example, configuration 180 is deployed to container 165 resulting in container 165 cloning deployment state 170A as deployment state 170B. In an example, container 160 and 165 may be deployed from the same image file, with container 165 updated to deployment state 170B after instantiation by a configuration management agent executing configuration 180. In another example, container 165 may be launched from a different, second image file constructed from the original image file and configuration instructions (e.g., outputs from state daemon 140 and/or configuration 180). In an example, container 165 may execute in a production mode without state daemon 140, while container 160 may execute in a development mode with state daemon 140 active.

In an example, further modifications are made to container 160, and these modifications are tracked by state daemon 140. In the example, deployment state 170A is therefore progressed to a new deployment state, and state daemon 140 generates new configuration instructions. In an example, at least one further modification to deployment state 170A may counteract at least one of the changes to the originally instantiated container 160 that resulted in deployment state 170A. In an example, a second configuration is generated by configuration generator 145, and the second configuration when executed on a new container launched from the same image file as container 160 takes the new container directly to the updated current deployment state of container 160 without progressing through an intermediary stage (e.g., deployment states 170A-B). For example, an application installed before the generation of configuration 180 may be uninstalled, and in the second configuration file, that application may never be installed.

Figure 4:
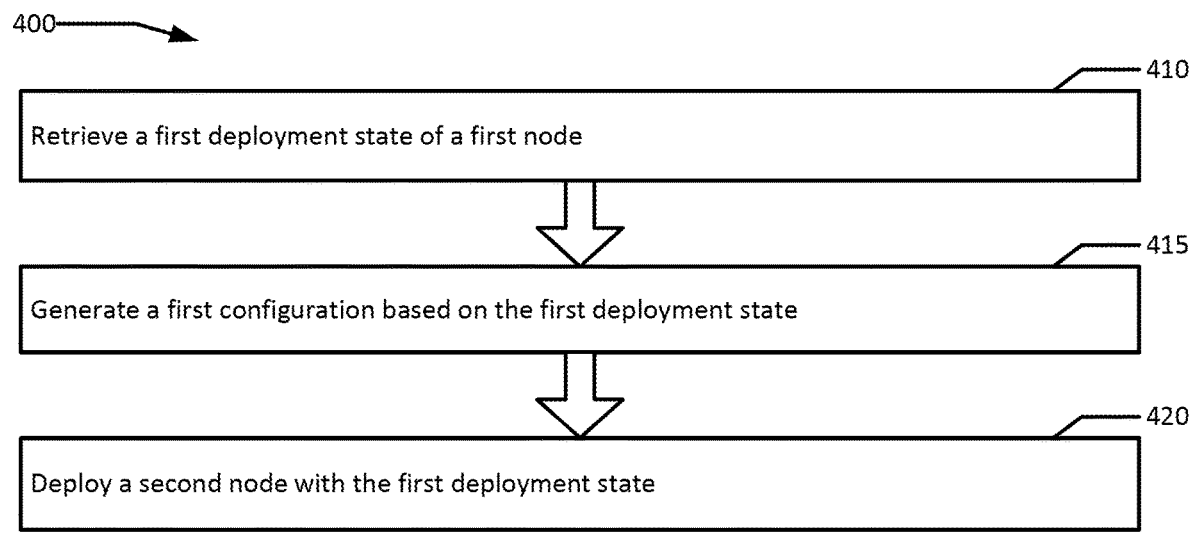
FIG. 4 is a flowchart illustrating an example of orchestrated deployment state based configuration generation according to an example of the present disclosure.

FIG. 4 is a flowchart illustrating an example of orchestrated deployment state based configuration generation according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by orchestrator 240.

Example method 400 may begin with retrieving a first deployment state of a first node (block 410). In an example, state engine 242 may retrieve deployment state 270A from development container 260. In an example where a state daemon is present, the state daemon on development container 260 may be queried. In examples where no local agent is deployed in the development environment, state engine 242 may indirectly retrieve deployment state 270A through queries, API calls, log scraping, or any other suitable method. In an example, deployment state 270A may include state settings of development container 260. In some examples, development container 260 (or another host node) may have multiple deployment states, for example, divided by user account. In various examples, a limited set of state settings may be included in deployment state 270A, limited based on application settings (e.g., tracking of configuration information of certain applications), user settings (e.g., tracking of configuration information based on account), group settings (e.g., tracking of configuration information based on a category of user (e.g., end user, system user, administrator)), and/or permission settings (e.g., tracking of changes to read only files etc.). In some examples, state engine 242 may retrieve deployment state 270A by accessing multiple nodes, for example, where development container 260 is controlled by an administrator accessing development container 260 from another host (e.g., physical hosts 210A-B), certain commands that affect development container 260 may be logged on the other host. In such an example, state engine 242 may retrieve state components by accessing information such as log files on physical hosts 210A-B.

A first configuration is generated based on the first deployment state (block 415). In an example, configuration generator 244 generates configuration 280 based on configuration information (e.g., deployment state 270A) retrieved by state engine 242. In an example, configuration generator 244 may be configured to combine several tracked modifications from state engine 242 into a unified modification to include in configuration 280. For example, multiple changes to the same application settings may be collapsed to directly yield a final setting. In an example, configuration generator 244 may generate multiple different versions of configuration 280 compatible with different configuration deployment agents.

A second node is deployed with the first deployment state based on the first configuration (block 420). In an example, configuration 280 may be deployed on existing or new containers to convert those containers to deployment state 270A. In an example, development container 260 may be deployed from a base image file in a base state, and is then modified into deployment state 270A. In an example, image file 285 is generated based on configuration 280 based on deployment state 270A. In the example, a plurality of copies of container 260 are requested to be deployed. Scheduler 246 selects physical hosts 210A-B to host the plurality of containers (e.g., containers 265A-C) and sends image file 285 to container engines 250 and 255 to be used to instantiate the containers 265A-C. In the example, deployment states 270B-D are cloned copies of deployment state 270A, and therefore containers 265A-C are cloned copies of development container 260.

In an example, development container 260 in deployment state 270A includes a first application (e.g., a web server) with a first application state (e.g., settings associated with the web server). In the example, a second application (e.g., a data cache) is deployed to development container 260, a software setting (e.g., a memory setting of the web server) is modified on development container 260, and/or a third component (e.g., an unused library for Perl®) is removed from development container 260. In the example, state engine 242 retrieves an updated version of deployment state 270A capturing the changes to the previous version of deployment state 270A. In the example, a new configuration is generated based on the updated deployment state 270A by configuration generator 244.

In an example, the node on which configuration changes are tracked may be a physical host (e.g., physical host 110B). In an example, orchestrator 240 may be in communication with physical host 110B, and may be instructed to clone physical host 110B's deployment state 175A to physical host 110C. In an example, state engine 242 may retrieve deployment state 175A, for example, by querying state daemon 142, for configuration generator 244 to generate configuration 185. In another example, orchestrator 240 may instruct configuration generator 147 executing on physical host 110B to generate configuration 185. In an example, deploying configuration 185 to physical host 110C may include installing and/or uninstalling an application on physical host 110C.

Figure 5:
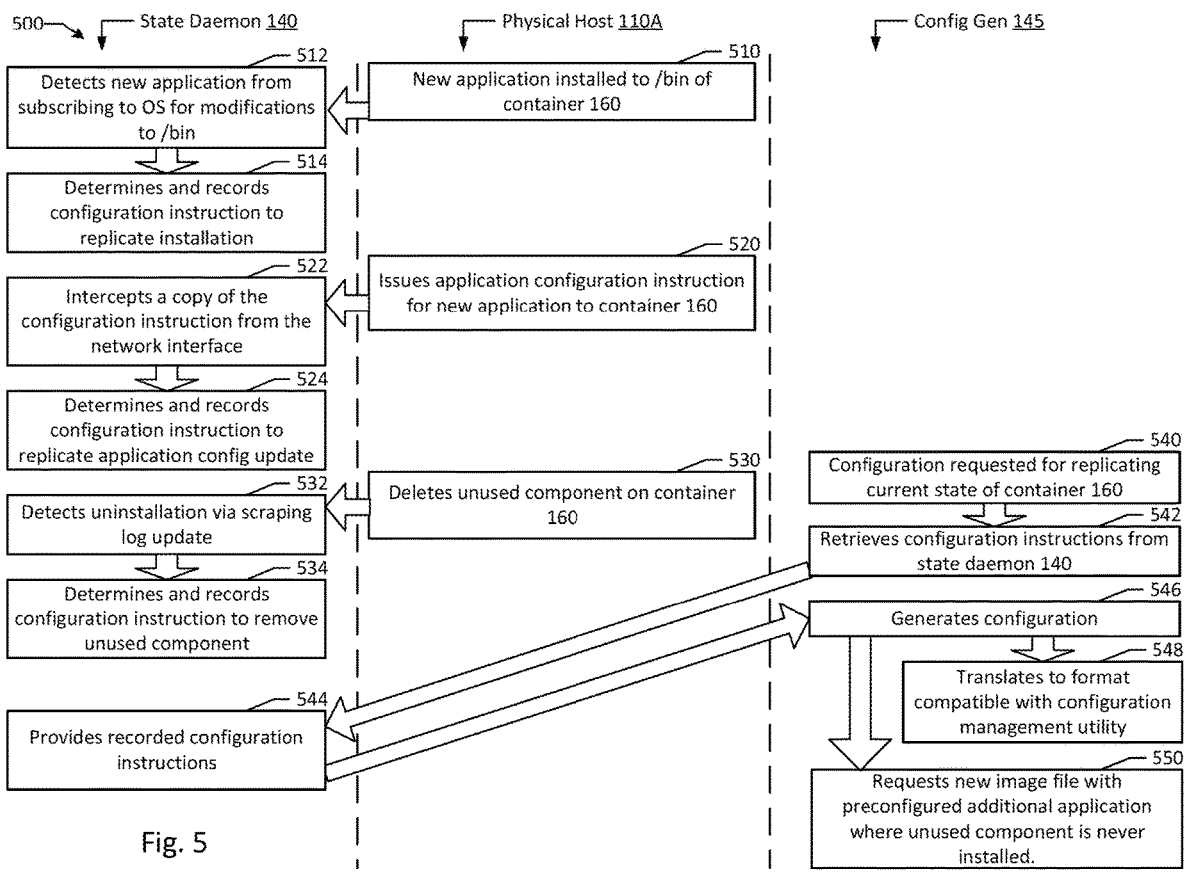
FIG. 5 is flow diagram of an example of deployment state based configuration generation according to an example of the present disclosure.

FIG. 5 is flow diagram of an example of deployment state based configuration generation according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, state daemon 140, configuration generator 145, and physical host 110A combine to execute deployment state based configuration generation.

In example system 500, physical host 110A may instruct container 160 to install a new application in the /bin directory of container 160 (block 510). State daemon 140 may detect the new application based on subscribing to guest OS 196 for notifications based on modifications to the /bin directory (block 512). For example, container 160 may host a web server application, and a data cache for the web server may be installed for increased performance. State daemon 140 may then determine and record configuration instructions to replicate the installation of the new application (block 514). After installation, an instruction from physical host 110A may modify a configuration of the new application on container 160 (block 520). For example, the new data cache may have its capacity or performance settings adjusted. In an example, state daemon 140 may intercept a copy of the configuration instructions from a virtual network interface employed by container 160 (block 522). In the example, state daemon 140 may then determine and record configuration instructions to replicate the configuration update made to the data cache application (block 524). In an example, physical host 110A may then issue a command to delete an unused component from container 160 (block 530). For example, container 160 may not use a graphics driver installed as part of an initial deployment build. In the example, state daemon 140 may detect the uninstallation via scraping logs for the update (block 532). For example, container 160 may employ yum as an installer, and the uninstallation may be recorded in a log generated by yum. In an example, state daemon 140 determines and records and appropriate configuration instruction to remove the unused component (block 534).

In an example, configuration generator 145 is requested to generate a configuration for replicating the current deployment state 170A of container 160 (block 540). In an example, configuration generator 145 retrieves configuration instructions generated by state daemon 140 (block 542). In an example, state daemon 140 responds by providing recorded configuration instructions of the above changes (block 544). In an example, configuration generator 145 generates a generic, vendor agnostic configuration 180 associated with deployment state 170A (block 546). In an example, configuration generator 145 translates the configuration 180 into a format compatible with Red Hat® Ansible® deployed as the configuration management utility on container 165 (block 548). In an example, Red Hat® Ansible® on container 165 executes configuration 180 transitioning container 165 to deployment state 170B. In an example, configuration generator 145 requests a new image file with the data cache application preinstalled and preconfigured, where the unused graphics driver is never included in the new image file (block 550). In an example, the new image file is used to instantiate multiple cloned instances of container 160.

Figure 6:
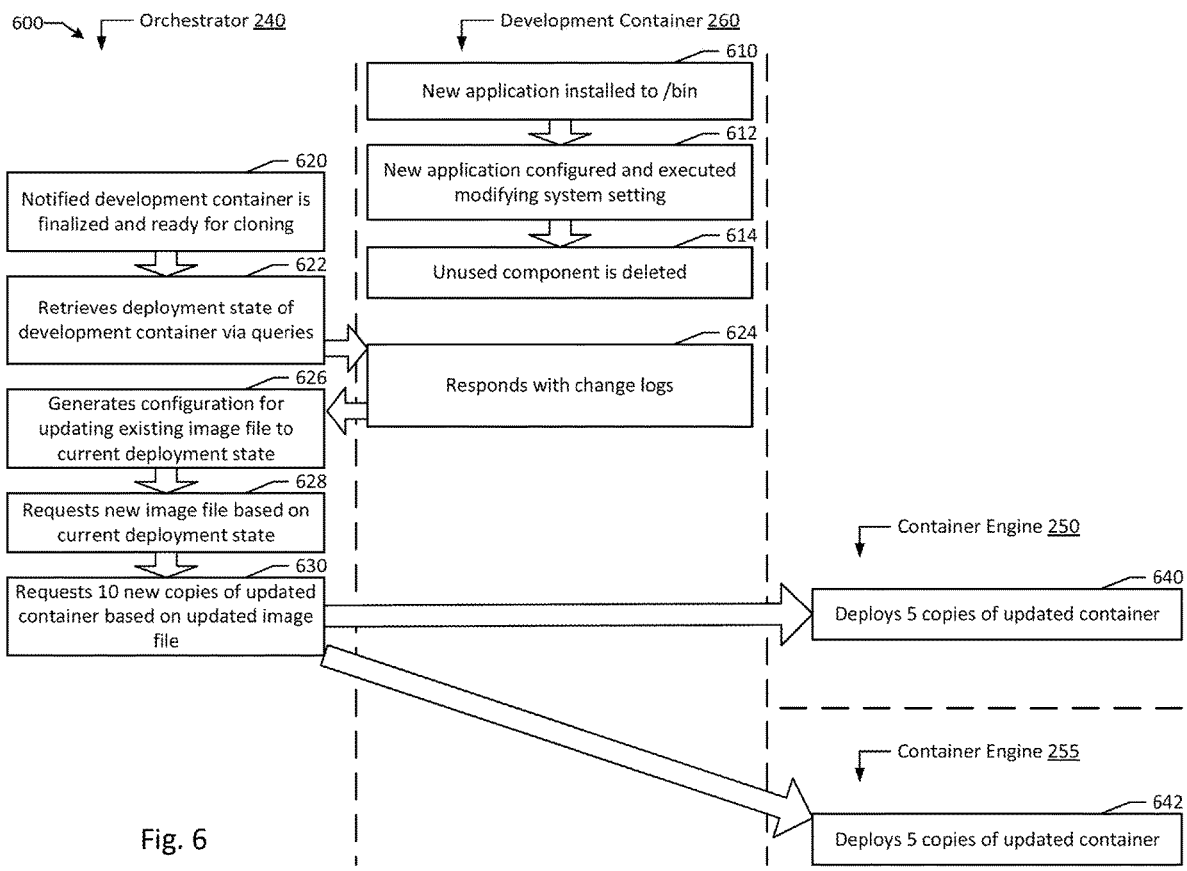
FIG. 6 is flow diagram of an example of orchestrated deployment state based configuration generation according to an example of the present disclosure.

FIG. 6 is flow diagram of an example of orchestrated deployment state based configuration generation according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, orchestrator 240, development container 260, container engine 250, and container engine 255 combine to execute orchestrated container deployment with deployment state based configuration generation.

In example system 600, a new application is installed to /bin on development container 260 (block 610). For example, a new pseudorandom number generator is installed for better pseudorandom number generation. In an example the new pseudorandom number generator is configured to be the default source of random numbers on development container 260 by being executed with a command that modifies a system setting on development container 260 (block 612). In an example, an unused pseudorandom number generator is deleted from development container 260 (block 614).

In an example, orchestrator 240 is notified that development container 260 has reached a finalized build state and is ready for cloning for testing and/or deployment (block 620). In an example, orchestrator 240 retrieves deployment state 270A of development container 260 via queries by state engine 242 (block 622). In an example, development container 260 responds to the queries with various change logs (e.g., yum logs for installs and uninstalls) (block 624). In an example, orchestrator 240 generates configuration 280 for updating an existing image file from which development container 260 is launched to deployment state 270A (block 626). In an example, orchestrator 240 requests the creation of image file 285 based on deployment state 270A (block 628). In an example, orchestrator 240 requests 10 cloned copies of development container 260 to be launched with image file 285 (block 630). In an example, physical hosts 210A-B both have excess capacity to host new containers. In the example, scheduler 246 assigns 5 copies to the new container to each of physical hosts 210A-B. In the example, scheduler 240 instructs each of container engines 250 and 255 to deploy 5 copies of a container from image file 285. Container engine 250 instantiates five copies of the updated container including container 265A in deployment state 270B (block 640). Container engine 255 also instantiates five copies of the updated container including containers 265B-C in deployment state 270C-D (block 640).

Figure 7A:
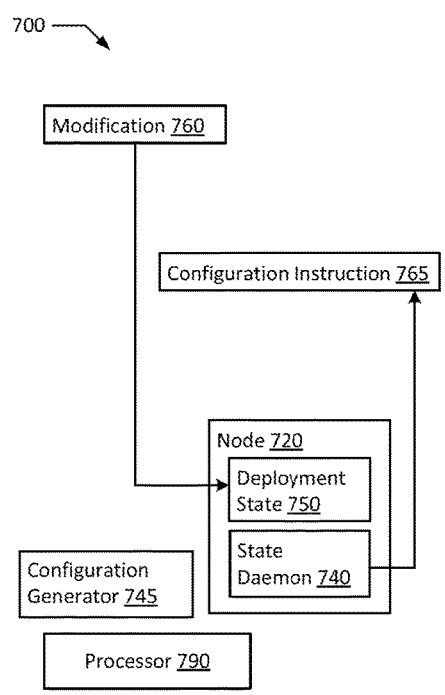
FIGS. 7A-B are block diagrams of an example deployment state based configuration generation system according to an example of the present disclosure.
Figure 7B:
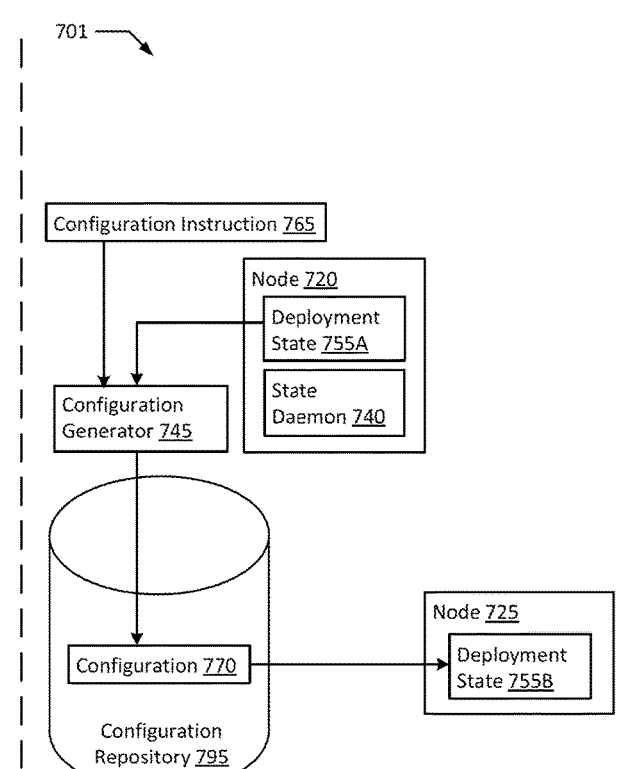

FIGS. 7A-B are block diagrams of an example deployment state based configuration generation system according to an example of the present disclosure. Example system 700 includes node 720 with state daemon 740 executing on node 720, where node 720 is in deployment state 750. System 700 also includes configuration generator 745, and processor 790 executing to record, by state daemon 740, configuration instruction 765 associated with modification 760 to deployment state 750. Example system 701 depicts node 720 in deployment state 755A after modification 760. Configuration generator 745 generates configuration 770 based on deployment state 755A including configuration instruction 765. Configuration 770 is stored in configuration repository 795, where configuration 770 is deployed to node 725 converting node 725 to deployment state 755B.

Figure 8:
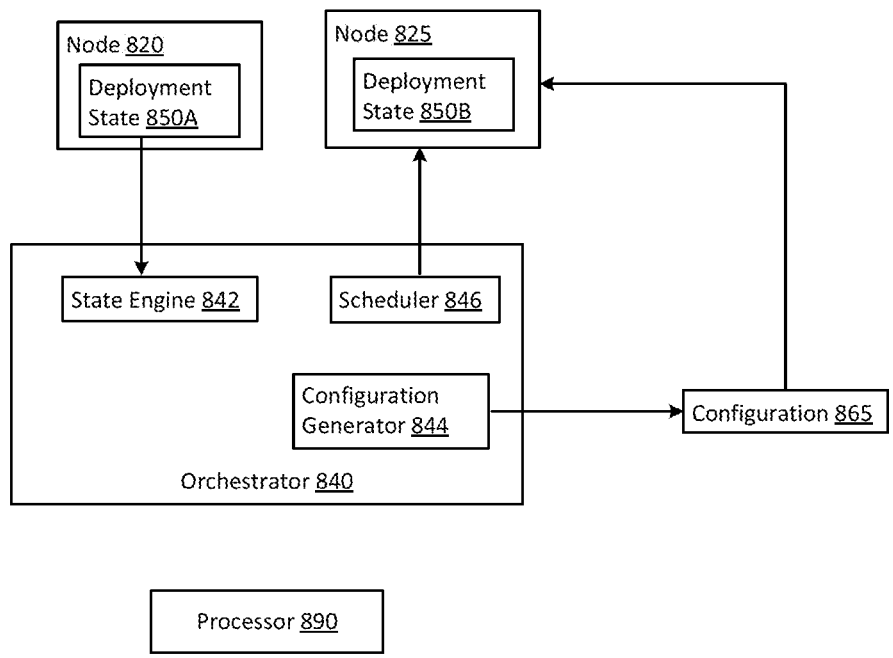
FIG. 8 is a block diagram of an example orchestrated deployment state based configuration generation system according to an example of the present disclosure.

FIG. 8 is a block diagram of an example orchestrated deployment state based configuration generation system according to an example of the present disclosure. Example system 800 includes node 820 with deployment state 850A. Orchestrator 840 includes state engine 842, configuration generator 844, and scheduler 846. The orchestrator 840 executes on processor 890. The state engine 842 retrieves deployment state 850A. Configuration generator 844 generates configuration 865 based on deployment state 850A. Scheduler 846 deploys node 825, which is deployed with deployment state 850B based on configuration 865.

Configuration management code construction is typically a process that adds days to a software development lifecycle before a new system build may be rolled out in a broad, automated release. Deployment state based configuration generation allows for rapid configuration management code generation, especially where a state daemon tracks changes on an ongoing basis, to quickly transition a project from development to acceptance testing, and production release. In addition, deployment state based configuration generation is fully backwards compatible and can be retrofit into legacy systems that are primarily physical hosts with little or no virtualization. Flexibility is maintained by enabling deployment both via orchestrated instantiation of virtualized guests (e.g., VMs and containers), and also through configuration management agent deployment on physical hosts without reimaging the whole host. A process that typically takes several days is thereby reduced to several minutes, drastically benefitting agile development of computer solutions. By decreasing the time spent packaging new updates for deployment, hardware utilization in development environments is increased due to requiring less time with changes frozen in order to construct release packages. Therefore development hardware may be returned to active testing soon after reaching a stable release state. Released code may also be more fault tolerant and better tested. For example, if packaging takes days, testing at scale may be too cumbersome for intermediate states. However, by reducing packaging to a matter of minutes, a developer may quickly deploy dozens of containerized instances of an application update, thereby potentially discovering code issues at a much earlier point in the development cycle than waiting for a nearly finalized product to scale up.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a first node with a state daemon executing on the first node, wherein the first node is in a first deployment state; a configuration generator; one or more processors executing to: record, by the state daemon, a first configuration instruction associated with a first modification to the first deployment state, wherein the first node is in a second deployment state after the first modification; generate, by the configuration generator, a first configuration based on the second deployment state including the first configuration instruction; and store the first configuration to a configuration repository, wherein the first configuration is deployed to a second node converting the second node to the second deployment state.

In accordance with a 2nd exemplary aspect of the present disclosure, which may be used in combination with any one or more of the preceding aspects (e.g., the 1st aspect), wherein the first node is an isolated guest deployed from a first image file, and a second image file is generated based on the second deployment state with the first configuration.

In accordance with a 3rd exemplary aspect of the present disclosure, which may be used in combination with any one or more of the preceding aspects (e.g., the 2nd aspect), wherein a third node is deployed from the second image file in a production mode with at least one of the state daemon and the configuration generator deactivated.

In accordance with a 4th exemplary aspect of the present disclosure, which may be used in combination with any one or more of the preceding aspects (e.g., the 1st aspect), wherein the configuration generator is across a network from the first node, and the configuration generator retrieves at least one of the first configuration instruction and the second deployment state from the state daemon. In accordance with a 5th exemplary aspect of the present disclosure, which may be used in combination with any one or more of the preceding aspects (e.g., the 1st aspect), wherein a second modification to the second deployment state further modifies a component modified by the first modification resulting in a third deployment state of the first node, and a second configuration instruction is generated by the state daemon, and a second configuration, when executed on a third node transitions the third node from the first deployment state to the third deployment state without the third node transitioning to the second deployment state. In accordance with a 6th exemplary aspect of the present disclosure, which may be used in combination with any one or more of the preceding aspects (e.g., the 1st aspect), wherein the first configuration is compatible with a first configuration deployment agent, and a second configuration also generated from the first deployment state by the configuration generator is compatible with a different second configuration deployment agent.

In accordance with a 7th exemplary aspect of the present disclosure, which may be used in combination with any one or more of the preceding aspects (e.g., the 1st aspect), wherein the state daemon subscribes to notifications of changes to the first node and records the first configuration instruction based on a first notification. In accordance with a 8th exemplary aspect of the present disclosure, which may be used in combination with any one or more of the preceding aspects (e.g., the 7th aspect), wherein the state daemon ignores a second notification when recording a later second configuration instruction.

Aspects of the subject matter described herein may be useful alone or in combination with one or more other aspects described herein. In a 9th exemplary aspect of the present disclosure, a method comprises: recording a first configuration instruction associated with a first modification to a first deployment state of a first node, wherein the first node is in a second deployment state after the first modification and a state daemon executes on the first node; generating a first configuration based on the second deployment state including the first configuration instruction; and storing the first configuration to a configuration repository, wherein the first configuration is deployed to a second node converting the second node to the second deployment state.

In accordance with a 10th exemplary aspect of the present disclosure, which may be used in combination with any one or more of the preceding aspects (e.g., the 9th aspect), wherein the first node is an isolated guest deployed from a first image file, and a second image file is generated based on the second deployment state with the first configuration. In accordance with a 11th exemplary aspect of the present disclosure, which may be used in combination with any one or more of the preceding aspects (e.g., the 10th aspect), wherein a third node is deployed from the second image file in a production mode with at least one of the state daemon and the configuration generator deactivated.

In accordance with a 12th exemplary aspect of the present disclosure, which may be used in combination with any one or more of the preceding aspects (e.g., the 9th aspect), wherein the configuration generator is across a network from the first node, and the configuration generator retrieves at least one of the first configuration instruction and the second deployment state from the state daemon. In accordance with a 13th exemplary aspect of the present disclosure, which may be used in combination with any one or more of the preceding aspects (e.g., the 9th aspect), wherein a second modification to the second deployment state further modifies a component modified by the first modification resulting in a third deployment state of the first node, and a second configuration instruction is generated by the state daemon, and the second configuration instruction, when executed on a third node transitions the third node from the first deployment state to the third deployment state without the third node transitioning to the second deployment state. In accordance with a 14th exemplary aspect of the present disclosure, which may be used in combination with any one or more of the preceding aspects (e.g., the 9th aspect), wherein the first configuration is compatible with a first configuration deployment agent, and a second configuration also generated from the first deployment state by the configuration generator is compatible with a different second configuration deployment agent.

In accordance with a 15th exemplary aspect of the present disclosure, which may be used in combination with any one or more of the preceding aspects (e.g., the 9th aspect), wherein the state daemon subscribes to notifications of changes to the first node and records the first configuration instruction based on a first notification. In accordance with a 16th exemplary aspect of the present disclosure, which may be used in combination with any one or more of the preceding aspects (e.g., the 15th aspect), wherein the state daemon ignores a second notification when recording a later second configuration instruction.

Aspects of the subject matter described herein may be useful alone or in combination with one or more other aspects described herein. In a 17th exemplary aspect of the present disclosure, a computer-readable non-transitory storage medium storing executable instructions, which when executed by a computer system, cause the computer system to: record a first configuration instruction associated with a first modification to a first deployment state of a first node, wherein the first node is in a second deployment state after the first modification and a state daemon executes on the first node; generate a first configuration based on the second deployment state including the first configuration instruction; and store the first configuration to a configuration repository, wherein the first configuration is deployed to a second node converting the second node to the second deployment state.

Aspects of the subject matter described herein may be useful alone or in combination with one or more other aspects described herein. In a 18th exemplary aspect of the present disclosure, a system comprises: a means for recording a first configuration instruction associated with a first modification to a first deployment state of a first node, wherein the first node is in a second deployment state after the first modification; a means for recording generating a first configuration based on the second deployment state including the first configuration instruction; and a means for recording storing the first configuration to a configuration repository, wherein the first configuration is deployed to a second node converting the second node to the second deployment state.

Aspects of the subject matter described herein may be useful alone or in combination with one or more other aspects described herein. In a 19th exemplary aspect of the present disclosure, a system comprises: a first node with a first deployment state; an orchestrator including a state engine, a configuration generator, and a scheduler, wherein the orchestrator executes on one or more processors to: retrieve, by the state engine, the first deployment state; generate, by the configuration generator, a first configuration based on the first deployment state; and deploy, by the scheduler, a second node, wherein the second node is deployed with the first deployment state based on the first configuration.

In accordance with a 20th exemplary aspect of the present disclosure, which may be used in combination with any one or more of the preceding aspects (e.g., the 19th aspect), wherein the first deployment state includes a first application and a first application state associated with the first application, and at least one of (i) a second application is deployed to the first node, (ii) a software setting is modified on the first node, and (iii) a third application is removed from the first node. In accordance with a 21st exemplary aspect of the present disclosure, which may be used in combination with any one or more of the preceding aspects (e.g., the 20th aspect), wherein an updated second deployment state of the first node is retrieved and a second configuration is generated based on the second deployment state.

In accordance with a 22nd exemplary aspect of the present disclosure, which may be used in combination with any one or more of the preceding aspects (e.g., the 19th aspect), wherein the first node is a first physical host, the second node is a second physical host, and deploying the second node includes at least one of installing and uninstalling an application based on the configuration.

In accordance with a 23rd exemplary aspect of the present disclosure, which may be used in combination with any one or more of the preceding aspects (e.g., the 19th aspect), wherein the first node is an isolated guest, the first node is deployed from a first image file in a first base state, and the first base state is modified to become the first deployment state. In accordance with a 24th exemplary aspect of the present disclosure, which may be used in combination with any one or more of the preceding aspects (e.g., the 23rd aspect), wherein a second image file is generated with the first configuration, and the second node is deployed with the second image file. In accordance with a 25th exemplary aspect of the present disclosure, which may be used in combination with any one or more of the preceding aspects (e.g., the 23rd aspect), wherein a first modification to the first base state and a second modification to the first base state are combined as a third modification included in the first configuration.

In accordance with a 26th exemplary aspect of the present disclosure, which may be used in combination with any one or more of the preceding aspects (e.g., the 19th aspect), wherein the first configuration is compatible with a first configuration deployment agent, and a second configuration also generated from the first deployment state by the configuration generator is compatible with a different second configuration deployment agent.

In accordance with a 27th exemplary aspect of the present disclosure, which may be used in combination with any one or more of the preceding aspects (e.g., the 19th aspect), wherein the first deployment state includes a limited set of state settings of the first node. In accordance with a 28th exemplary aspect of the present disclosure, which may be used in combination with any one or more of the preceding aspects (e.g., the 27th aspect), wherein the limited set of state settings is limited based on at least one of an application setting, a user setting, a group setting, and a permission setting.

In accordance with a 29th exemplary aspect of the present disclosure, which may be used in combination with any one or more of the preceding aspects (e.g., the 19th aspect), wherein the first deployment state includes a first state component on the first node and a second state component on a third node.

Aspects of the subject matter described herein may be useful alone or in combination with one or more other aspects described herein. In a 30th exemplary aspect of the present disclosure, a method comprises: retrieving a first deployment state of a first node; generating a first configuration based on the first deployment state; and deploying a second node, wherein the second node is deployed with the first deployment state based on the first configuration.

In accordance with a 31st exemplary aspect of the present disclosure, which may be used in combination with any one or more of the preceding aspects (e.g., the 30th aspect), wherein the first deployment state includes a first application and a first application state associated with the first application, and at least one of (i) a second application is deployed to the first node, (ii) a software setting is modified on the first node, and (iii) a third application is removed from the first node. In accordance with a 32nd exemplary aspect of the present disclosure, which may be used in combination with any one or more of the preceding aspects (e.g., the 31st aspect), wherein an updated second deployment state of the first node is retrieved and a second configuration is generated based on the second deployment state.

In accordance with a 33rd exemplary aspect of the present disclosure, which may be used in combination with any one or more of the preceding aspects (e.g., the 30th aspect), wherein the first node is a first physical host, the second node is a second physical host, and deploying the second node includes at least one of installing and uninstalling an application based on the configuration.

In accordance with a 34th exemplary aspect of the present disclosure, which may be used in combination with any one or more of the preceding aspects (e.g., the 30th aspect), wherein the first node is an isolated guest, the first node is deployed from a first image file in a first base state, and the first base state is modified to become the first deployment state. In accordance with a 35th exemplary aspect of the present disclosure, which may be used in combination with any one or more of the preceding aspects (e.g., the 34th aspect), wherein a second image file is generated with the first configuration, and the second node is deployed with the second image file. In accordance with a 36th exemplary aspect of the present disclosure, which may be used in combination with any one or more of the preceding aspects (e.g., the 34th aspect), wherein a first modification to the first base state and a second modification to the first base state are combined as a third modification included in the first configuration.

In accordance with a 37th exemplary aspect of the present disclosure, which may be used in combination with any one or more of the preceding aspects (e.g., the 30th aspect), wherein the first configuration is compatible with a first configuration deployment agent, and a second configuration also generated from the first deployment state by the configuration generator is compatible with a different second configuration deployment agent.

In accordance with a 38th exemplary aspect of the present disclosure, which may be used in combination with any one or more of the preceding aspects (e.g., the 30th aspect), wherein the first deployment state includes a limited set of state settings of the first node. In accordance with a 39th exemplary aspect of the present disclosure, which may be used in combination with any one or more of the preceding aspects (e.g., the 38th aspect), wherein the limited set of state settings is limited based on at least one of an application setting, a user setting, a group setting, and a permission setting.

In accordance with a 40th exemplary aspect of the present disclosure, which may be used in combination with any one or more of the preceding aspects (e.g., the 30th aspect), wherein the first deployment state includes a first state component on the first node and a second state component on a third node.

Aspects of the subject matter described herein may be useful alone or in combination with one or more other aspects described herein. In a 41st exemplary aspect of the present disclosure, a computer-readable non-transitory storage medium storing executable instructions, which when executed by a computer system, cause the computer system to: retrieving a first deployment state of a first node; generating a first configuration based on the first deployment state; and deploying a second node, wherein the second node is deployed with the first deployment state based on the first configuration.

Aspects of the subject matter described herein may be useful alone or in combination with one or more other aspects described herein. In a 42nd exemplary aspect of the present disclosure, a system comprises: a means for retrieving a first deployment state of a first node; a means for generating a first configuration based on the first deployment state; and a means for deploying a second node, wherein the second node is deployed with the first deployment state based on the first configuration.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a first node deployed from a base configuration, wherein at a first time, the first node is in a first deployment state;
a state daemon executing on the first node, the state daemon configured to:
record a first configuration instruction associated with a first tracked modification to the first deployment state, wherein the first node is in a second deployment state at a second time after the first tracked modification, wherein the state daemon is operable to track executed commands to retrieve information associated with the first configuration instruction, and
determine that the first tracked modification is required for the second deployment state to be deployed from the base configuration, wherein the recording of the first configuration instruction is based on the determination; and
a configuration generator executing on one or more processors to:
generate a first configuration in a first format based on the second deployment state, wherein the first configuration includes the first configuration instruction based on the first configuration instruction being recorded by the state daemon, wherein a new instance of the second deployment state is configured to be deployed from the base configuration using the first configuration, and the first configuration in the first format is incompatible with a second format of a second node;
store the first configuration to a configuration repository;
translate the first configuration into the second format of the second node; and
deploy the translated first configuration to the second node to launch the new instance by converting the second node to the second deployment state,
wherein the state daemon subscribes to notifications of changes to the first node and records the first configuration instruction based on a first notification,
wherein the state daemon ignores a second notification when recording a later second configuration instruction.

2. The system of claim 1, wherein the first node is an isolated guest deployed from a first image file, and a second image file is generated based on the second deployment state with the first configuration.

3. The system of claim 2, wherein a third node is deployed from the second image file in a production mode with at least one of the state daemon and the configuration generator deactivated.

4. The system of claim 1, wherein the configuration generator is across a network from the first node, and the configuration generator retrieves at least one of the first configuration instruction and the second deployment state from the state daemon.

5. The system of claim 1, wherein a second tracked modification to the second deployment state further modifies a component modified by the first tracked modification resulting in a third deployment state of the first node, and the second configuration instruction is generated by the state daemon, and a second configuration, when executed on a third node, transitions the third node from the first deployment state to the third deployment state without the third node transitioning to the second deployment state.

6. The system of claim 1, wherein the first configuration is compatible with a first configuration deployment agent, and a second configuration also generated from the first deployment state by the configuration generator is compatible with a different second configuration deployment agent.

7. A method comprising:
recording, by a state daemon executing on a first node, a first configuration instruction associated with a tracked modification to a first deployment state of the first node, wherein the first node is deployed from a base configuration, wherein the first node is in the first deployment state at a first time, wherein the first node is in a second deployment state at a second time after the tracked modification, wherein the state daemon executes on the first node, and wherein the state daemon is operable to track executed commands to retrieve information associated with the first configuration instruction;

determining, by the state daemon, that tracked modification is required for the second deployment state to be deployed from the base configuration, wherein the recording of the first configuration instruction by the state daemon is based on the determining;

generating a first configuration in a first format based on the second deployment state, wherein the first configuration includes the first configuration instruction based on the first configuration instruction being recorded by the state daemon, wherein a new instance of the second deployment state is configured to be deployed from the base configuration using the first configuration, and the first configuration in the first format is incompatible with a second format of a second node;

storing the first configuration to a configuration repository;

translating the first configuration into the second format of the second node; and deploying the translated first configuration to the second node to launch the new instance by converting the second node to the second deployment state, wherein the state daemon subscribes to notifications of changes to the first node and records the first configuration instruction based on a first notification, wherein the state daemon ignores a second notification when recording a later second configuration instruction.

8. The method of claim 7, wherein the first node is an isolated guest deployed from a first image file, and a second image file is generated based on the second deployment state with the first configuration.

9. The method of claim 8, wherein a third node is deployed from the second image file in a production mode with at least one of the state daemon and a configuration generator deactivated.

10. The method of claim 7, wherein a configuration generator is across a network from the first node, and the configuration generator retrieves at least one of the first configuration instruction and the second deployment state from the state daemon.

11. The method of claim 7, wherein a second tracked modification to the second deployment state further modifies a component modified by the tracked modification resulting in a third deployment state of the first node, and the second configuration instruction is generated by the state daemon, and a second configuration, when executed on a third node, transitions the third node from the first deployment state to the third deployment state without the third node transitioning to the second deployment state.

12. The method of claim 7, wherein the first configuration is compatible with a first configuration deployment agent, and a second configuration also generated from the first deployment state by a configuration generator is compatible with a different second configuration deployment agent.

13. A non-transitory computer readable medium storing instructions which, when executed, cause one or more processors to:

record, by a state daemon executing on a first node, a first configuration instruction associated with a tracked modification to a first deployment state of the first node, wherein the first node is deployed from a base configuration, wherein the first node is in the first deployment state at a first time, wherein the first node is in a second deployment state at a second time after the tracked modification, wherein the state daemon executes on the first node, and wherein the state daemon is operable to track executed commands to retrieve information associated with the first configuration instruction;

determine, by the state daemon, that tracked modification is required for the second deployment state to be deployed from the base configuration, wherein the recording of the first configuration instruction by the state daemon is based on the determining;

generate a first configuration in a first format based on the second deployment state, wherein the first configuration includes the first configuration instruction based on the first configuration instruction being recorded by the state daemon, wherein a new instance of the second deployment state is configured to be deployed from the base configuration using the first configuration, and the first configuration in the first form at is incompatible with a second format of a second node;

storing the first configuration to a configuration repository;

translating the first configuration into the second format of the second node; and deploying the translated first configuration to the second node to launch the new instance by converting the second node to the second deployment state, wherein the state daemon subscribes to notifications of changes to the first node and records the first configuration instruction based on a first notification, wherein the state daemon ignores a second notification when recording a later second configuration instruction.

14. The non-transitory computer readable medium of claim 13, wherein the first node is an isolated guest deployed from a first image file, and a second image file is generated based on the second deployment state with the first configuration.

15. The non-transitory computer readable medium of claim 14, wherein a third node is deployed from the second image file in a production mode with at least one of the state daemon and a configuration generator deactivated.

16. The non-transitory computer readable medium of claim 13, wherein a configuration generator is across a network from the first node, and the configuration generator retrieves at least one of the first configuration instruction and the second deployment state from the state daemon.

17. The non-transitory computer readable medium of claim 13, wherein a second tracked modification to the second deployment state further modifies a component modified by the tracked modification resulting in a third deployment state of the first node, and the second configuration instruction is generated by the state daemon, and a second configuration, when executed on a third node, transitions the third node from the first deployment state to the third deployment state without the third node transitioning to the second deployment state.

18. The non-transitory computer readable medium of claim 13, wherein the first configuration is compatible with a first configuration deployment agent, and a second configuration also generated from the first deployment state by a configuration generator is compatible with a different second configuration deployment agent.

* * * * *

UNITED STATES PATENT AND TRADEMARK OFFICE
CERTIFICATE OF CORRECTION

| | |
|---|---|
| PATENT NO. | : 11,303,508 B2 |
| APPLICATION NO. | : 15/844056 |
| DATED | : April 12, 2022 |
| INVENTOR(S) | : Arie Bregman et al. |

It is certified that error appears in the above-identified patent and that said Letters Patent is hereby corrected as shown below:

In the Specification

In Column 3, Line 3, replace "interne." with -- internet. --.

In Column 5, Line 25, replace "VIVID" with -- VMD --.

In the Claims

In Column 22, Line 20 (Claim 13), replace "form at" with -- format --.

Signed and Sealed this
Second Day of August, 2022

Katherine Kelly Vidal
*Director of the United States Patent and Trademark Office*